(12) United States Patent
Eberle et al.

(10) Patent No.: US 10,946,718 B2
(45) Date of Patent: Mar. 16, 2021

(54) AIR-CONDITIONING UNIT OF A VEHICLE

(71) Applicant: Mahle International GmbH, Stuttgart (DE)

(72) Inventors: Daniel Eberle, Stuttgart (DE); Rainer Knoeller, Jettingen (DE); Markus Michael, Ilsfeld (DE); Anja Reiter, Schorndorf (DE); Oliver Schultze, Stuttgart (DE); Joachim Treier, Oppenau (DE); Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 185 days.

(21) Appl. No.: 16/120,265

(22) Filed: Sep. 2, 2018

(65) Prior Publication Data

US 2019/0070926 A1 Mar. 7, 2019

(30) Foreign Application Priority Data

Sep. 4, 2017 (DE) .......................... 102017215458.6

(51) Int. Cl.
*B60H 1/00* (2006.01)
*B60H 3/06* (2006.01)

(52) U.S. Cl.
CPC ......... *B60H 1/00849* (2013.01); *B60H 1/008* (2013.01); *B60H 1/00792* (2013.01); *B60H 3/0608* (2013.01); *B60H 2001/00714* (2013.01)

(58) Field of Classification Search
CPC ............ B60H 1/00849; B60H 1/00792; B60H 1/008; B60H 3/0608; B60H 2001/00714
(Continued)

(56) References Cited

U.S. PATENT DOCUMENTS 4,412,425 A * 11/1983 Fukami .............. B60H 1/00007
62/244
4,932,588 A * 6/1990 Fedter ................ B60H 1/00764
165/224

(Continued)

FOREIGN PATENT DOCUMENTS

DE 10 2008 021 015 A1 10/2008
DE 10 2013 214 071 A1 1/2015
(Continued)

OTHER PUBLICATIONS

English abstract for DE-10 2008 021 015.
English abstract for JP-S64-56 223.
English abstract for JP-2002-29245.

*Primary Examiner* — Edelmira Bosques
*Assistant Examiner* — Dana K Tighe
(74) *Attorney, Agent, or Firm* — Fishman Stewart PLLC

(57) ABSTRACT

An air-conditioning unit of a vehicle for air-conditioning a vehicle interior may include a unit outlet for discharging air into the vehicle interior, an outside-air duct for an intake of outside air, and an air recirculation duct for recirculation of inside air from the vehicle interior. The air-conditioning unit may also include an outside-air shut-off element arranged in the outside-air duct, which in a closed position blocks a flow of outside air through the outside-air duct, and a recirculated-air shut-off element arranged in the air recirculation duct, which in a closed position blocks a flow of inside air through the air recirculation duct. The air-conditioning unit may further include a sensor device for detecting a property of air. On at least one duct of the outside-air duct and the recirculation duct, a bypass may be arranged which bypasses an associated shut-off element and is fluidically connected to the sensor device.

20 Claims, 3 Drawing Sheets

(58) Field of Classification Search
USPC .......................................................... 454/75
See application file for complete search history.

(56) References Cited

U.S. PATENT DOCUMENTS

| | | | |
|---|---|---|---|
| 5,299,631 A * | 4/1994 | Dauvergne | B60H 1/034 |
| | | | 165/204 |
| 5,309,731 A * | 5/1994 | Nonoyama | B60H 1/00849 |
| | | | 62/244 |
| 6,352,102 B1 * | 3/2002 | Takechi | B60H 1/00064 |
| | | | 165/203 |
| 6,371,202 B1 * | 4/2002 | Takano | B60H 1/00914 |
| | | | 165/202 |
| 6,758,739 B1 | 7/2004 | Sangwan et al. | |
| 7,931,075 B2 * | 4/2011 | Ito | B60H 1/00028 |
| | | | 165/122 |
| 2006/0252362 A1 | 11/2006 | Ito et al. | |
| 2015/0343882 A1 * | 12/2015 | Satzger | B60H 1/00778 |
| | | | 165/202 |
| 2016/0052363 A1 | 2/2016 | Ostermeier et al. | |
| 2016/0082809 A1 * | 3/2016 | Wang | B60H 1/248 |
| | | | 454/139 |
| 2016/0229266 A1 * | 8/2016 | Maeda | B60H 1/00849 |

FOREIGN PATENT DOCUMENTS

| | | |
|---|---|---|
| JP | S64-56 223 A | 3/1989 |
| JP | 2002-29245 A | 1/2002 |

* cited by examiner

AIR-CONDITIONING UNIT OF A VEHICLE

CROSS-REFERENCE TO RELATED APPLICATIONS

This application claims priority to German Patent Application No. DE 10 2017 215 458.6, filed on Sep. 4, 2017, the contents of which are hereby incorporated by reference in its entirety.

TECHNICAL FIELD

The present invention relates to an air-conditioning unit of a vehicle for air-conditioning a vehicle interior. The invention further relates to a vehicle having such an air-conditioning unit.

BACKGROUND

In the operation of an air-conditioning unit, outside air is typically pumped into the air-conditioning unit through an outside-air duct, usually air-conditioned with the aid of at least one heat exchanger and fed to the interior of a vehicle. It is desirable, if necessary, in particular if the quality of the outside air is inadequate, to recirculate air from the interior of the vehicle. This is usually achieved by providing an air recirculation duct, which is fluidically connected to the vehicle interior, in such a way that air from the interior of the vehicle is sucked in through the air recirculation duct and fed back into the vehicle interior via an outlet of the air-conditioning unit, wherein the air can be air-conditioned by means of at least one such heat exchanger before being re-introduced into the interior of the vehicle. In order to supply the air-conditioning unit with outside air and/or air from the vehicle interior if required, it is advantageous to provide shut-off elements in each of the outside-air duct and the air recirculation duct, which allow the blocking and release of the associated duct. To determine the quality of the air, a sensor device can also be provided that detects a property of air, wherein the detection of this property can be used to operate the air-conditioning unit in different operating modes.

Such an air-conditioning device is known from DE 10 2013 214 071 A1. If the shut-off in the outside-air duct is in a closed position blocking the air duct, then to detect the property of the outside air the in the shut-off element arranged in the outside-air duct is opened briefly, in order to feed outside air to the sensor device. Similarly, if the shut-off element arranged in the air recirculation duct blocks the recirculation duct, then to detect the property of the air emerging from the vehicle interior the shut-off element in the air recirculation duct is opened briefly, to feed air from the interior of the vehicle to the sensor device.

A disadvantage of this is that the sensor device is fed air that may already have been present upstream of the shut-off element in the associated duct for some time, which means the property detected with the sensor device may differ from the property of the air currently in the interior of the vehicle or in the surroundings of the vehicle, and therefore may differ from the current outside air. In addition, in the prior art in detecting the property of the air, conditions can arise in which, at least temporarily, outside air is fed to the interior of the vehicle or air from the interior of the vehicle is recirculated, although this is not desirable, in particular on account of the quality of the air.

SUMMARY

The object of the present invention therefore is to specify improved or at least alternative embodiments for an air-conditioning unit of the above-mentioned type and for a vehicle having such an air-conditioning unit, that are in particular characterized by a more reliable detection of a property of the air and/or an improved separation between different operating modes of the air-conditioning unit.

This object is achieved according to the invention by means of the subject matter of the independent claim(s). Advantageous embodiments are the subject matter of the dependent claim(s).

The present invention is based on the general idea, in an air-conditioning unit for air-conditioning a vehicle interior of a vehicle, of fluidically connecting a sensor device to a duct of the air-conditioning unit via a bypass, which bypasses a shut-off element arranged in this duct that blocks the duct in a closed position. This allows the sensor device, even in said closed position, to be fed with air from the duct in order to detect a property of the air. Accordingly, there is no need to open the shut-off element in order to detect the property, which would lead to an unwanted mixing of the air emanating from the duct with air to be fed to the interior of the vehicle. As a result, different operating modes of the air-conditioning unit can be better separated from each other. In addition, the sensor device can also be exposed to a continuous air flow out of the duct even in the closed position of the shut-off element, so that the sensor device determines the property of the air with an increased reliability, in particular because the property that is measured is not now that of air which has become stale in a closed position upstream of the shut-off element, in other words air that has been standing for a long time. In accordance with the idea underlying the invention, the air-conditioning unit has a unit outlet, through which air is discharged into the interior of the vehicle. The air-conditioning unit also has an outside-air duct for the intake of air from the surroundings, or outside air, into the air-conditioning unit, which is fluidically connected to the unit outlet. In addition, the air-conditioning unit has an air recirculation duct for recirculating air from the interior of the vehicle, or inside air, which is fluidically connected to the interior of the vehicle and to the unit outlet. Such a shut-off element is arranged in both the outside-air duct and the air recirculation duct. This means that in the outside-air duct an outside-air shut-off element is provided, which in a closed position blocks the flow of outside air through the outside-air duct. In addition, a recirculated-air shut-off element is provided in the air recirculation duct, which in a closed position blocks the flow of inside air through the air recirculation duct. According to the invention it is provided that on at least one of the ducts, that is to say on the outside-air duct and/or on the air recirculation duct, a bypass is provided which bypasses the shut-off element provided in this duct and which is fluidically connected to the sensor device. This means that on the outside-air duct a bypass is provided, hereafter also referred to as an outside-air bypass, which bypasses the outside-air shut-off element and is fluidically connected to the sensor device. Alternatively or additionally, such a bypass is provided on the air recirculation duct and is hereafter also referred to as a recirculated-air bypass, which bypasses the recirculated-air shut-off element.

It is conceivable that the air-conditioning unit has only one such bypass, which bypasses the associated shut-off element. It is preferable if such an outside-air bypass and such a recirculated-air bypass is provided, wherein the outside-air bypass bypasses the outside-air shut-off element, while the recirculated-air bypass bypasses the recirculated-air shut-off element.

The respective bypass is preferably designed in such a way that it bypasses the associated shut-off element, i.e. the shut-off element that is to be bypassed, in the closed position of the shut-off element. This means that the bypass bypasses the associated shut-off element in the closed position of this shut-off element and is fluidically connected to the sensor device, whereas a bypassing of the shut-off element in an open position of the shut-off element which releases the associated duct is not necessarily provided.

It is preferable if the bypass is separated from the duct downstream of the shut-off device being bypassed, in such a way that a flow of air through the bypass downstream of the shut-off element is separated from an air flow through the duct in which the shut-off element is provided. It is thereby possible to feed the air to the sensor device separately from the air that is fed to the interior of the vehicle, so that an improved separation of the operating modes of the air-conditioning unit is achieved.

The at least one bypass is preferably designed, in particular dimensioned, in such a way that, particularly in the open position of the shut-off element provided in the duct that releases the duct, less air flows through the bypass than through the associated duct.

The different operating modes of the air-conditioning unit may in particular comprise an outside-air mode and an air recirculation mode, wherein in the outside-air operating mode the air-conditioning unit feeds outside air to the vehicle interior originating from the surroundings of the air-conditioning unit or the associated vehicle, whereas in the air recirculation mode air from the interior of the vehicle is recirculated. Accordingly, in the outside-air mode the recirculated-air shut-off element is set to the closed position, while the outside-air shut-off element is set to the open position. In contrast, in the air recirculation mode the recirculated-air shut-off element is set to the open position, while the outside-air shut-off element is set to the closed position. Self-evidently, operating modes between the air recirculation mode and the outside-air mode, hereafter also referred to as a mixed operating mode, are also possible, as are intermediate positions of the respective shut-off element between the closed position and the open position.

The air-conditioning unit advantageously has at least one filter device for filtering air, hereafter also referred to as a unit filter device, and at least one heat exchanger for air conditioning. With the at least one heat exchanger it is possible to control the air temperature and/or to modify the humidity of the air. It is preferable in this case if the air delivered to the vehicle interior, that is to say in the outside-air operating mode outside air originating from the surroundings and in the air recirculation mode inside air from the interior of the vehicle, is passed through the filter device and/or through at least one such a heat exchanger, in order to be filtered and/or air-conditioned.

The respective shut-off element can in principle be designed in any desired manner, provided it blocks the associated duct in the closed position. In particular, the respective shut-off element can be designed as a shutter or a valve or can comprise such a shutter or such a valve.

At least one such shut-off element can have a base body and a seal, which surrounds the base body in particular around its edges or is fitted around the edge of the base body, wherein in the closed position of the shut-off element the seal seals against the duct.

Advantageous embodiments are those in which at least one such bypass on the associated shut-off element, in other words on the shut-off element that is bypassed using this bypass, has a flow-permeable bypass cross-section and a bypass duct, which in the closed position of the shut-off element extends from the bypass cross-section to the sensor device. This means that the bypass cross-section is provided on the shut-off element which is being bypassed. This allows a simplified implementation of the bypass in the closed position of the shut-off element.

The bypass cross-section can be at least partially formed by a gap provided between the shut-off element and the associated duct in the closed position. This means that such a gap, specially provided to form the bypass, is provided between the shut-off element and the associated duct, which gap is a component of the bypass in the closed position of the shut-off element. In particular, in the closed position of the shut-off element the gap has specified dimensions, in particular a specified cross section. Therefore, in the closed position of the shut-off element, a predefined leakage is created between the shut-off element and the duct, wherein this leakage is an integral part of the bypass cross-section, in particular forms the latter, and is used to feed air to the sensor device from the associated duct, including in the closed position of the bypass.

Alternatively or in addition, it is conceivable to form the bypass cross-section, at least partly, by a recess in the shut-off element.

It is conceivable to arrange or form the recess on the shut-off element at least partly in the seal. Possible embodiments here are those in which the seal has such a recess provided especially for the bypass, for example in the form of a cutout.

Alternatively or in addition, it is conceivable that the said recess is arranged or formed at least partly in the base body of the shut-off element. Conceivable variants here are those in which a through passage, in particular a hole which at least partially forms said recess, is provided in the base body.

Also conceivable are embodiments in which the recess is at least partly arranged in the base body, in particular as an edge-side through passage, and partly in the seal, in particular as such a cutout, directly adjoining the part of the recess in the base body. This means that in the closed position of the shut-off element the recess has a contiguous flow-permeable cross-section, which is arranged, in particular constructed, partly in the base body and partly in the seal.

Alternatively, it is conceivable to form at least one such bypass completely separately from the associated shut-off element. In this case the bypass branches off the associated duct upstream of the shut-off element and discharges into the sensor device.

The sensor device can in principle be designed arbitrarily, provided it detects or determines at least one property of the air in operation.

The property of the air detected with the sensor device is preferably such a property as reflects the quality of the air or else is correlated with the air quality. This may include, in particular, the number and/or density of particles in the air. In particular, the property examined by means of the sensor device can be the fine particulate density in the air. In this regard, air with a lower fine particulate density has a higher quality than air with a higher fine particulate density. Also, the at least one property can be the concentration of nitrogen oxides and/or carbon oxides and/or oxygen and the like in the air.

It is conceivable to provide at least one such inspection duct with an interaction section, in which the at least one property of the air is detected.

The sensor device preferably uses electromagnetic waves to detect the at least one property of the air. This allows a simple and precise determination of the at least one property of the air. To this end the sensor device preferably has a generating device for generating the electromagnetic waves, which traverse, in particular penetrate, the at least one inspection duct to detect the at least one property, and in doing so interact with air flowing through the inspection duct in the interaction section. The generating device can in principle generate electromagnetic waves of any type, which means in particular of any wavelength and/or period. In particular, the generating device can generate and emit pulsed electromagnetic waves. In addition, the generating device can generate and emit in particular monochromatic electromagnetic waves.

The sensor device also has at least one detector, which can detect the electromagnetic waves after their passage through the inspection duct and the interaction with the air, to determine the at least one property of the air.

Preferred embodiments also provide for a generating device which generates electromagnetic waves in the optical range. The generating device is preferably implemented as an optical generating device. The generating device preferably has a laser or is implemented as such a laser. This allows the generating device to be implemented and/or integrated into the air-conditioning unit in a simplified form. The wavelength of the electromagnetic waves or the light is, for example, in the range of the order of magnitude of particularly the smallest particles to be detected in the air, in particular between 10 and 10,000 nanometres.

The sensor device also has at least one detector, which can detect the electromagnetic waves after their passage through the inspection duct and the interaction with the air, to determine the at least one property of the air.

To improve the accuracy of the detected property of the air, the interaction section is preferably designed in such a way that the interaction of the electromagnetic waves with the inspection duct therein can be prevented or at least reduced. To this end it is possible to produce the inspection duct in the interaction section from an appropriately transparent material, such as glass, plastic, etc.

The interaction section is preferably designed as a discontinuity in the inspection duct. This means that when passing through the interaction section the deflected electromagnetic waves do not interact with the inspection duct, in particular with a duct sheath that bounds the flow path through the inspection duct, in which the discontinuity is formed. This leads to a more accurate detection of the at least one property of the air flowing through the inspection duct.

The discontinuity can be designed to be continuous around the periphery, so that the inspection duct is completely interrupted in the interaction section. It is also conceivable to form the discontinuity as a through passage of the inspection duct, through which the deflected electromagnetic waves pass at the input and output ends.

The air-conditioning system, in particular the sensor device, is in particular designed in such a way that the discontinuity of the inspection duct to form the interaction section does not lead to any, or at least only a reduced, outflow of the air flowing through the inspection duct out of the inspection duct or the interaction section. The prevention or reduction of the outflow of the air flowing through the inspection duct out of the inspection duct or the interaction section prevents or reduces, in particular, contaminations of the sensor device, particularly of the respective detector and/or the generating device, due to the air flowing through the inspection duct.

To this end the inspection duct advantageously has a nozzle, hereafter also referred to as the duct nozzle, directed through the inspection duct in the flow direction towards the discontinuity, which guides and/or focuses the air flowing through the inspection duct in the region of the interaction section in such a way that, after flowing through the interaction section, the air flows through the inspection duct again and/or as little air as possible leaves the inspection duct.

Alternatively or additionally, the interaction section of a flow path can be enclosed by a flow path of a sheath air in such a way that the outflow of the air flowing through the interaction section from the inspection duct or the interaction section is at least reduced. For this purpose, the flow of the sheath air through said flow path, hereafter also referred to as the sheath air flow path, can take place with increased pressure and/or increased speed in comparison to the flow of the air, the property of which is to be determined and which flows through the inspection duct.

Preferably, the sheath air gives rise to no, or at least reduced, interactions with the deflected electromagnetic waves passing through the interaction section that could affect the detection of the at least one property of the air flowing through the inspection duct. For this purpose, the sheath air is different to the air flowing through the inspection duct, in particular fresh air or purified air.

The sheath air flow path can be implemented by a sheath air duct surrounding the inspection duct, particularly in the area of the interaction section, wherein the sheath air duct can have a discontinuity in the region surrounding the interaction section of such a kind that the deflected electromagnetic waves can pass through without interaction with the sheath air duct.

It is conceivable to guide the sheath air flow path or the sheath air duct and the inspection duct in the sensor device downstream of the interaction section jointly. This means, in particular, that air flowing through the inspection duct mixes with sheath air downstream of the interaction section and the two are guided in a common duct, which corresponds to the inspection duct and the sheath air duct. This simplifies the structure of the sensor device. In addition, the escape of air flowing through the inspection duct from the interaction section into the sensor housing can be more effectively prevented.

The detector, which detects the deflected electromagnetic waves after the interaction with the air, can in principle be arranged in an arbitrary way. In particular, it is conceivable to arrange the detector inside the interaction section in such a way that the deflected electromagnetic waves are detected inside the interaction section after the interaction with the air.

The detector is advantageously arranged adjacent to the interaction section. This will in particular prevent the detector from interacting with the air flowing through the inspection duct, in particular from being contaminated by said air.

It is preferable to arrange the detector outside of the interaction section. In particular, the detector is arranged on the side of the interaction section facing away from an inlet side of the interaction section, wherein the inlet side is the side of the interaction section through which the deflected electromagnetic waves first pass into the interaction section.

If two or more such interaction sections are provided, it is conceivable to position them relative to each other in such a way that the same detector can be used to detect the deflected electromagnetic waves which have passed through the interaction sections.

It is preferable, however, to assign such an associated detector to the respective interaction section. This allows a more accurate detection of the at least one property of the air flowing through the respective inspection duct. In addition, the properties of the air flowing through the respective inspection duct can be detected independently of each other and/or at the same time.

The air-conditioning advantageously has a control device, which is communicatively connected to the shut-off elements and the sensor device in such a way that it can query and control them. The control device is preferably designed in such a way that it operates the air-conditioning unit as a function of the property of the air detected by means of the at least one sensor device. Advantageously the control device operates the air-conditioning unit in the air recirculation mode if the quality of the outside air falls below a specified value and/or is worse than the quality of the inside air. In addition, the control device preferably operates the air-conditioning unit in the outside-air mode if the quality of the outside air is above a specified value and/or if the outside air has a better quality than the inside air.

It goes without saying that the control device is designed in such a way that it can operate the air-conditioning unit in a mixed mode, in which the interior of the vehicle is sometimes fed with outside air and inside air is sometimes recirculated.

It goes without saying that, in addition to the air-conditioning unit, a vehicle having a vehicle interior and such an air-conditioning unit for air-conditioning the interior of the vehicle are also included within the scope of this invention.

Other key features and advantages of the invention follow from the dependent claims, from the drawings and from the associated description of the figures based on the drawings.

It goes without saying that the aforementioned features and those yet to be explained below can be applied not only in the corresponding specified combination, but also in other combinations or in isolation without departing from the scope of the present invention.

Preferred exemplary embodiments of the invention are shown in the drawings and will be explained in more detail in the following description, wherein identical or similar reference numerals refer to identical or similar or functionally equivalent components.

BRIEF DESCRIPTION OF THE DRAWINGS

These show, schematically in each case.

DETAILED DESCRIPTION

Figure 1:
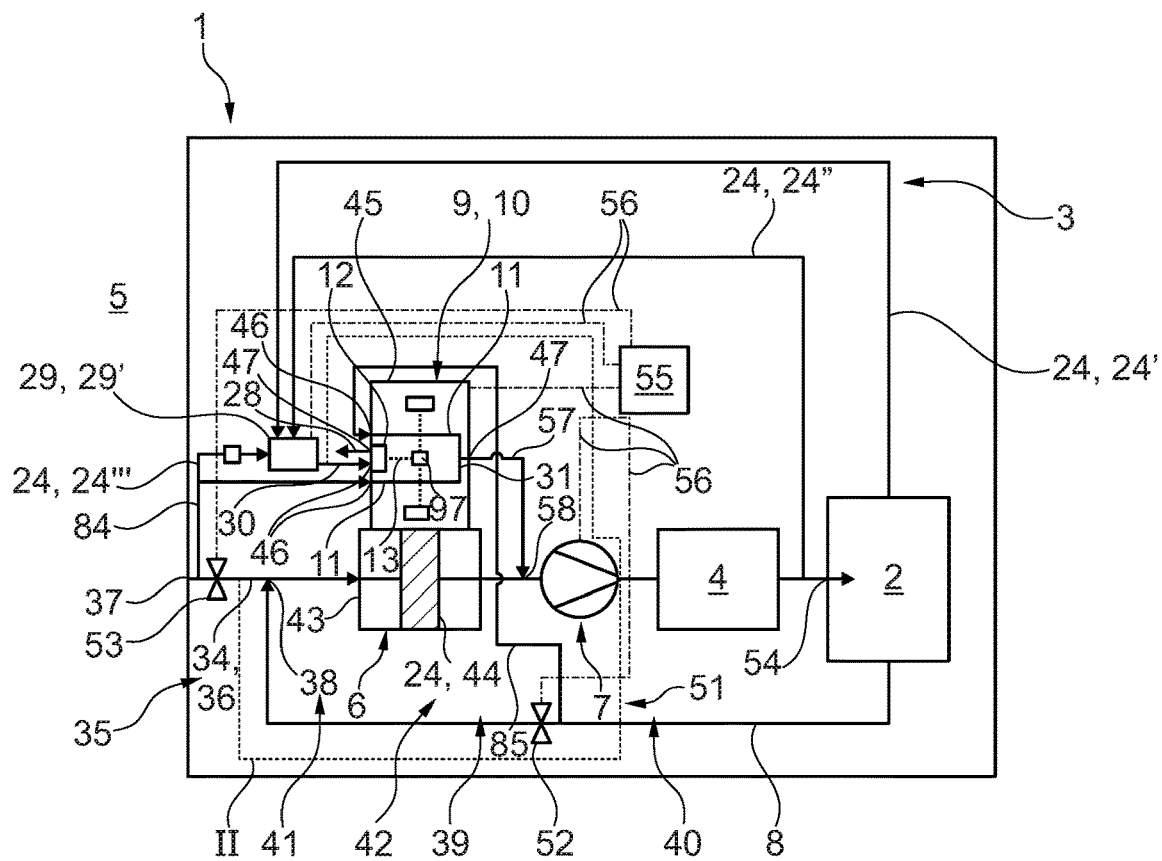
FIG. 1 a highly simplified, circuit-like representation of a vehicle with an air-conditioning unit, FIG. 2 an enlarged illustration of the region designated with II in FIG. 1, FIG. 3 a longitudinal section through a duct with a shut-off element, FIG. 4 a frontal view of the shut-off element, FIG. 5 the view of FIG. 3 in another exemplary embodiment, FIG. 6 a frontal view of the shut-off element of FIG. 5, FIG. 7 the view of FIG. 6 in another exemplary embodiment, FIG. 8 the view of FIG. 5 in another exemplary embodiment, FIG. 9 a cross section through the duct in FIG. 7 in the area of the shut-off element, FIG. 10 a longitudinal section through a sensor device of the air-conditioning unit in another exemplary embodiment.
Figure 2:
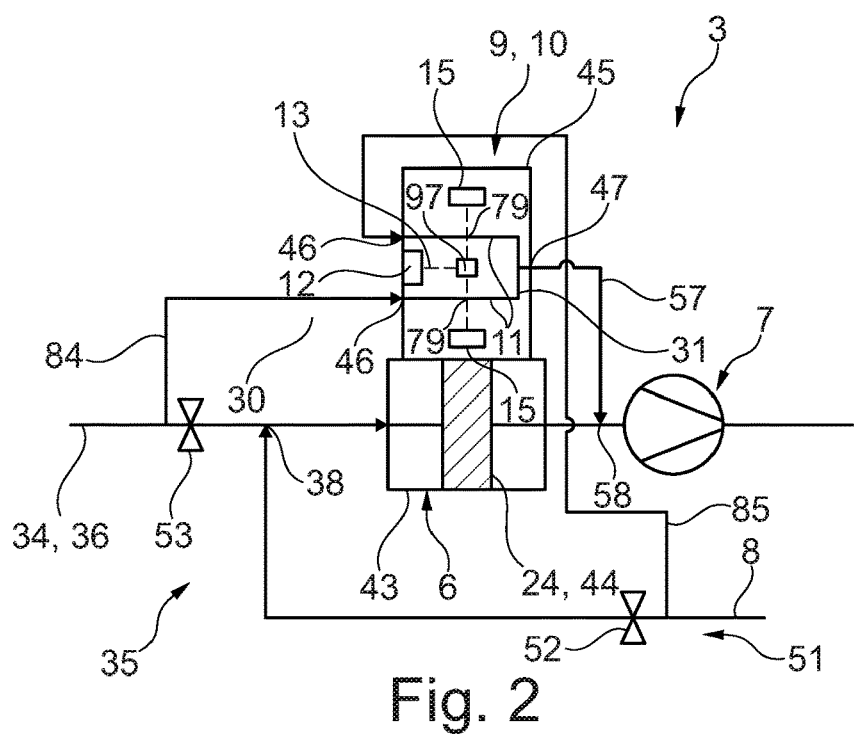

An air-conditioning unit 3, such as that shown in FIGS. 1 and 2, is in particular a component of a vehicle 1 which has a vehicle interior 2 for occupants, not shown. The air-conditioning unit 3 feeds air to the vehicle interior 2 for air-conditioning the vehicle interior 2 and has a duct system 35, through which air flows during operation. The air-conditioning unit 3 has at least one heat exchanger 4 arranged in the duct system 35 for air-conditioning the air, wherein the at least one heat exchanger 4 allows the air temperature to be controlled and/or the humidity of the air to be modified. The air-conditioning unit 3 also has a filter device 6 in the duct system 35, hereafter referred to as the unit filter device 6, for filtering the air to be fed to the interior 2, and a conveyor device 7, hereafter also referred to as the unit conveyor device 7, for conveying air through the air-conditioning unit 3. In the examples shown the heat exchanger 4 is arranged downstream of the conveyor device 7 and the filter device 6 is upstream of the conveyor device 7. The duct system 35 has an outside-air duct 36, with which outside air, in other words air from an environment 5 of the air-conditioning unit 3 or the vehicle 1, enters the air-conditioning unit 3. In the examples shown the outside-air duct 36 extends from a unit inlet 37 connected to the environment 5 as far as a unit outlet 54, which is fluidically connected to the vehicle interior 2, in particular connected to the vehicle interior 2 and through which air is discharged into the interior of the vehicle 2. The filter device 6, the conveyor device 7 and the at least one heat exchanger 4 are arranged in the outside-air duct 36, which hereafter is also referred to as the main duct 34. The duct system 35 also has an air recirculation duct 8, which is used for the recirculation of air from the vehicle interior 2, or inside air. The air recirculation duct 8 is fluidically connected to the vehicle interior 2 and to the unit outlet 54, wherein in the examples shown the air recirculation duct 8 branches off from the vehicle interior 2 and discharges into the main duct 34 at a recirculated-air discharge point 38 upstream of the filter device 6 and downstream of the unit inlet 37.

The air-conditioning unit 3 also has a sensor device 9, which detects at least one property of air. The at least one property of the air detected with the sensor device 9 is preferably a property that corresponds to the quality or is at least correlated therewith. In particular, the at least one property can be a particle concentration, in particular a fine particulate matter concentration, the concentration of nitrogen oxides and/or carbon oxides and/or oxygen and the like. The sensor device 9 is thus in particular a fine particulate matter sensor 10 for detecting the fine particulate matter content in air, or preferably has such a fine particulate matter sensor 10. The sensor device 9 has at least one inspection duct 11 through which air can flow, and a generating device 12. With the generating device 12 electromagnetic waves 13 are generated, in particular monochromatic electromagnetic waves 13, for example monochromatic light, which pass through, in particular penetrate, the inspection duct 11 in an interaction section 79. In the interaction section 79 of the inspection duct 11, an interaction of the electromagnetic waves therefore occurs with the air flowing through the inspection duct 11, which hereafter is also referred to as the air to be examined, wherein the interaction enables the detection of at least one property of the air to be examined. To this end the sensor device 9 has a detector 15, which detects the electromagnetic waves 13 after their passage through the inspection duct 11 and the interaction with the air. In the sensor device 9, which is designed as or comprises a fine particulate matter sensor 10, the concentration of particulate matter in the air to be examined can therefore be detected or determined. The generating device 12 in this case has a source 16 for generating the electromagnetic waves 13 and a controller 17 for controlling the source 16. The source 16 in the example shown is implemented as a laser 18, which is controlled with the controller 17.

For temperature controlling the generating device 12, in particular the source 16 and/or the controller 17, a temperature control duct 24 is provided, which feeds air-conditioned air to the sensor temperature control chamber 19 and thus applies the air-conditioned air to the generating device 12 for the purpose of temperature controlling the generating device 12. The air-conditioned air can originate from the vehicle interior 2 of the vehicle 1. To this end, such a temperature control duct 24', hereafter also referred to as the first temperature control duct 24', passes air from the vehicle interior 2 to the sensor temperature control chamber 19. Thus, a heat exchange occurs between the generating device 12 and the air-conditioned air fed to the sensor temperature control chamber 19, so that the generating device 12 is temperature controlled. Alternatively or additionally, air-conditioned air originating from the main duct 34 downstream of the at least one heat exchanger 4 and upstream of the vehicle interior 2 can be fed to the sensor temperature control chamber 19, and therefore applied to the generating device 12. To this end such a temperature control duct 24" is provided, which is hereafter referred to as the second temperature control duct 24". The second temperature control duct 24" branches from the main duct 34 downstream of the at least one heat exchanger 4 and upstream of the vehicle interior 2, in particular from a mixing chamber, not shown, of the air-conditioning unit 3 and discharges into the sensor temperature control chamber 19. Alternatively or additionally it is conceivable, by means of such a temperature control duct 24', also referred to as the third temperature control duct 24', to branch air off from the main duct 34 or outside-air duct 36 upstream of the at least one heat exchanger 4 and upstream of the unit filter device 6, and therefore to feed outside air to the temperature sensor control chamber 19 to temperature control the generating device 12, wherein in this case the outside air has been previously cleaned and/or filtered. The air-conditioned air fed to the sensor temperature control chamber 19 for the purpose of temperature controlling the generating device 12 flows through the sensor temperature control chamber 19 and travels through a sensor outlet 47 and a sensor temperature control outlet duct 28 out of the sensor temperature control sensor temperature control chamber 19.

It is preferable if the air fed to the sensor temperature control chamber 19, which is used for the temperature control of the generating device 12, is cleaned or filtered before being applied to the generating device 12, in particular to prevent or reduce contamination of the source 16 or of a wave outlet area of the source 16, not shown. This can be performed using the unit filter device 6. It is also conceivable, in particular in the second temperature control duct 24" and/or in the third temperature control duct 24', to provide a separate filter device 26 from the unit filter device 6, hereafter also referred to as a sensor temperature control filter device 26, in order to filter the air before its entry into the sensor temperature control chamber 19. The respective sensor temperature control filter device 26 can comprise a fine particulate matter filter 27 or be configured as such. In the examples shown such a sensor temperature control filter device 26 is provided only in the third temperature control duct 24', wherein it is also conceivable to provide such a sensor temperature control filter device 26 in the first temperature control duct 24'. The temperature control ducts 24 discharge in the examples shown into a sensor temperature control valve device 29, in particular into a multi-way valve 29' whose outlet is fluidically connected via a sensor temperature control supply duct 30 to the sensor temperature control chamber 19. Using the sensor temperature control valve device 29 it is possible optionally to feed air from the respective temperature control duct 24' to the sensor temperature control chamber 19 and therefore to apply air to the generating device 12 for the purpose of temperature control. Of course, it is also possible to mix air originating from at least two of the temperature control ducts 24 and to feed it to the sensor temperature control chamber 19. In this case, such a sensor temperature control filter device 26 can be arranged in the sensor temperature control supply duct 30 (not shown) in order to dispense with such a separate sensor temperature control filter device 26 in the temperature control duct 24.

In the examples shown in FIGS. 1 and 2, the sensor device 9 has two such inspection ducts 11 spaced apart from each other, wherein the generating device 12 is arranged between the substantially parallel inspection ducts 11. The generating device 12, in particular the laser 18, is arranged in such a way that it emits the generated electromagnetic waves 13 between and along the inspection ducts 11. The sensor device 9 has a deflection device 97 which feeds the electromagnetic waves 13 emitted by the generating device 12 to the interaction section 79 of at least one of the inspection ducts 11, in such a way that the deflected electromagnetic waves 13 penetrate or pass through the interaction section 79 and interact with air flowing through the inspection duct 11. After the interaction with the air, the deflected electromagnetic waves 13 are detected by an associated detector 15 to detect at least one property of the air, with which the electromagnetic waves 13 previously interacted. The deflection device 97 is designed in such a way that it deflects the electromagnetic waves 13 emitted by the generating device 12 to the interaction section 79 of the respective inspection duct 11. This means that the deflection device 97 deflects the emitted electromagnetic waves 13 both in the direction of the interaction section 79 of the one inspection duct 11 and in the direction of the interaction section 79 of the other inspection duct 11. For this purpose, the deflection device 97 can have a conduit 104 that guides the electromagnetic waves 13, in particular an optical fibre 105 (see FIG. 9), in particular an optical fibre, a mirror, a beam divider or combinations thereof (none of which is shown). Such a detector 15 is assigned to the respective inspection duct 11, so that by means of the same generating device 12 at least one property of air flowing through the one inspection duct 11, and independently thereof, through the other inspection duct 11 can be detected. The detector 15 assigned to the respective inspection duct 11 or interaction section 79 is advantageously arranged on the side of the interaction section 79 facing away from the inlet side of the electromagnetic waves 13 into the associated interaction section 79 and outside of the interaction section 79. This prevents or at least reduces the detection of the electromagnetic waves 13 deflected in the direction of the other interaction section 79 and/or enables a more independent detection of the at least one property of the air flowing through the respective inspection duct 11. The consequence of the arrangement of the respective detector 15 outside the interaction section 79 is that contaminations of the detector 15 caused by the air flowing through the respective inspection duct 11 is minimized or at least reduced.

The unit conveyor device 7 divides the duct system 35 into an upstream suction area 39 and a downstream pressurised area 40. This means that the conveyor device 7 separates the suction area 39 arranged upstream of the conveyor device 7 from the pressurised area 40 downstream of the conveyor device 7. The unit conveyor device 6 divides the duct system 35 into an upstream raw area 41 and a downstream clean area 42. The unit filter device 6 has a housing 43, hereafter also referred to as a filter housing 43, in which a filter material 44 is arranged, which can be a fine particulate matter filter 27 or part of such a device, for filtering air. Air is cleaned as it passes through the filter material 44, so that the separation of the duct system 35 into the raw area 41 and the clean area 42 is effected with the aid of the filter material 44.

The sensor device 9 has a housing 45, hereafter also referred to as sensor housing 45, in which the at least one inspection duct 11 is arranged. In the examples shown, the generating device 12 and the detectors 15 are also arranged in the sensor housing 45. The sensor device 9 also has at least one sensor inlet 46, through which air is admitted into the sensor device 9, in particular into the at least one inspection duct 11. The sensor housing 45 is arranged on the filter housing 43.

The sensor device 9 shown has two such sensor inlets 46, each of which is fluidically connected to such an inspection duct 11. In addition, such a sensor inlet 46 is fluidically connected to the sensor temperature control supply duct 30 to admit air into the sensor temperature control chamber 19. The sensor device 9 also has at least one sensor outlet 47 for discharging air from the sensor device 9, wherein in the examples shown such a sensor outlet 47 for discharging air flowing through the at least one inspection duct 11 and such a sensor outlet 47 for discharging air from the sensor temperature control chamber 19, which is fluidically connected to a sensor temperature control outlet duct 28, are provided. The air flowing out of the respective sensor outlet 47 can in principle be fed to the surroundings 5, as is shown for example for air flowing into the sensor temperature control outlet duct 28. The air flowing out of the respective sensor outlet 47 can also be fed to the duct system 35, as is shown, for example, for the sensor outlet 47 fluidically connected to the at least one inspection duct 11. For this purpose, a sensor feedback duct 57 is provided, which is fluidically connected to this sensor outlet 47 and which discharges, for example, into the main duct 34 via a sensor discharge point 58, wherein in the examples shown here the sensor discharge point 58 is arranged between the unit filter device 6 and the unit conveyor device 7. It is also conceivable to arrange the sensor discharge point 58 upstream of the unit filter device 6, or in the raw area 41, in order to filter the recirculated air with the unit filter device 6.

The air-conditioning unit 3 has a shut-off device 51, which has a recirculated-air shut-off element 52 provided, in particular arranged, in the air recirculation duct 8 and an outside-air shut-off element 53 provided, in particular arranged, in the outside-air duct 36 or main duct 34. The recirculated-air discharge point 38 is arranged downstream of the outside-air shut-off element 53. The shut-off device 51 is adjustable between an air recirculation setting and an outside-air setting, wherein in the air recirculation setting the outside-air shut-off element 53 blocks the outside-air duct 36 or main duct 34 in a closed position 86 (see FIGS. 3, 5, 7, 8) and the recirculated-air shut-off element 52 releases the air recirculation duct 8 in an open position 88 (see FIGS. 3, 5, 7), so that no air from the surroundings 5 and hence no outside air can enter the air-conditioning unit 3, whereas air from the vehicle interior 2, hence inside air, is drawn in from the interior of the vehicle 2 by means of the conveyor device 7 and returned through the unit outlet 54 to the vehicle interior 2 and is thus recirculated. In the process, as a result of the arrangement of the recirculated-air discharge point 38, the air in the air-conditioning unit 3 originating from the vehicle interior 2 passes through the filter device 6 and the at least one heat exchanger 4. In the outside-air position, on the other hand, the air recirculation duct 8 is blocked by means of the recirculated-air shut-off element 52 in the closed position 86 (see FIGS. 3, 5, 7, 8), while in the open position 88 (see FIGS. 3, 5, 7) the outside-air shut-off element 53 releases the outside-air duct 36. Thus, a flow of air through the air recirculation duct 8 is prevented, whereas air from the surroundings 5 and thus outside air enters the air-conditioning unit 3. The unit conveyor device 7 is arranged between the recirculated-air shut-off element 52 and the outside-air shut-off element 53. With this unit conveyor device 7 it is therefore possible to pump air from the surroundings 5 in the outside-air position and air from the interior of the vehicle 2 in the air recirculation position, and feed it to the unit outlet 54. It goes without saying that with this arrangement it is also possible in intermediate positions both to pump air from the interior of the vehicle 2 and air from the surroundings 5 and feed it to the unit outlet 54.

The air-conditioning unit 3 has a control device 55, which can also be an integral part of the vehicle 1. The control device 55 is communicatively connected via communication connections 56 to the sensor device 9, the shut-off device 51 and thus to the shut-off elements 52, 53, to the unit conveyor device 7 and to the sensor temperature control valve device 29, in such a way that the control device 55 can control and/or interrogate each of these. In addition, the control device 55 can be communicatively connected to the controller 17 of the generating device 12 in order to interrogate and/or control it.

In particular, the control device 55 is configured in such a way that it operates the air-conditioning unit 3 in an outside-air mode if the quality of the outside air exceeds a specified value, in particular is better than the quality of the air from the interior of the vehicle 2, whereas it operates the air-conditioning unit 3 in an air recirculation mode if the quality of the outside air drops below a specified value and/or the quality of the air in the interior of the vehicle 2 is better than the quality of the outside air. To this end, in the air recirculation mode the control device 55 adjusts the shut-off device 51 into the air recirculation position and in the outside-air mode, moves it into the outside-air position. It goes without saying that positions between the air recirculation position and the outside-air position are also possible, as are operation of the air-conditioning unit 3 between the air recirculation mode and the outside-air mode.

On the outside-air duct 36 and/or on the air recirculation duct 8 in each case a bypass 84, 85 is provided that bypasses the associated shut-off element 52, 53, wherein the respective bypass 84 and 85 is fluidically connected to the sensor device 9, in particular to such a sensor inlet 46, in such a way that air flowing through the respective bypass 84, 85 flows to the sensor device 9 and into such an inspection duct 11, in which the at least one property of the air is determined. In the example shown, such a bypass 84, 85 is provided on the respective duct 8, 36. This means that on the outside-air duct 36 a bypass 84 is provided, hereafter also referred to as the outside-air bypass 84, which bypasses the outside-air shut-off element 53 and is fluidically connected to the sensor device 9, in the example shown to such an associated inspection duct 11, and therefore feeds air from the surroundings 5, or outside air, to this inspection duct 11. In addition, on the air recirculation duct 8 a bypass 85 is provided, hereafter also referred to as the recirculated-air bypass 85, which bypasses the recirculated-air shut-off element 52 and is fluidically connected to the sensor device 9, in the example shown to such an associated inspection duct 11, and therefore feeds air from the vehicle interior 2 to this inspection duct 11.

The respective bypass 84, 85 then allows air located upstream of the associated shut-off element 52, 53 to be also passed to the sensor device 9 and the at least one property thereof to be detected if the associated shut-off element 52 is set in the closed position. In particular, the respective bypass 84, 85 allows a continuous flow of air to be passed to the sensor device 9. In addition, this avoids the need to open the shut-off element 52, 53 in order to feed air to the sensor device 9 to detect the at least one property. This also prevents stale air from downstream of the shut-off element 52 reaching the sensor device 9 after opening the associated shut-off element 52, 53, so that properties are not detected that do not match the current properties of the inside air in the vehicle interior 2 or the outside air from the surroundings 5. In the example shown the third temperature control duct 24' branches off the outside-air bypass 84, so that outside air can also be fed to the sensor device 9 as temperature-controlled air even when the outside-air shut-off element 53 is in the closed position. In FIGS. 1 and 2 it is also apparent that the respective bypass 84, 85 is separated from the duct 8, 36 downstream of the shut-off device 52, 53 in such a way that the flow of air through the bypass 84, 85 downstream of the respective shut-off element 52, 53 is separated from a flow of air through the respective duct 8, 36. This means that air diverted by means of the respective bypasses 84, 85 which bypasses the associated shut-off element 52, 53, is then not directly fed to the associated duct 8, 36.

Figure 3:
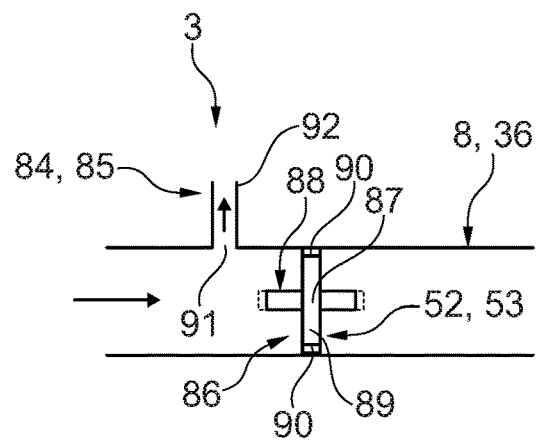
Figure 4:
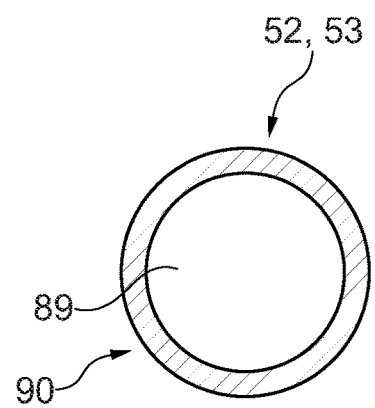

FIG. 3 shows a section through the air recirculation duct 8 in the area of the recirculated-air shut-off element 52, wherein the section shown can be exactly the same as such a section through the outside-air duct 36 in the area of the outside-air shut-off element 53. The associated shut-off element 52, 53, which is shown in the closed position 86, is located in the duct 8, 36. The shut-off element 52, 53 is repositioned, for instance by pivoting about a pivot axis 87, between the closed position 86 and the open position 88, shown with a dashed line, in which the shut-off element 52, 53 releases the associated duct 8, 36. The shut-off element 52, 53 is shown in FIG. 4 in a frontal elevation, wherein it is apparent that the shut-off element 52, 53 has a base body 89 and a seal 90 fitted around the edge of the base body 89, which forms a seal against the duct 8, 36 in the closed position 86 (see FIG. 3). In the example shown the base body 89 is round and the seal 90 is annular.

In the exemplary embodiment shown in FIG. 3, the bypass 84, 85 branches off the duct 8, 36 upstream of the shut-off element 52, 53 via a branching point 91, hereafter also referred to as the bypass-branching point 91, and is connected via a bypass duct 92 to such an associated sensor inlet 46, wherein the bypass duct 92 extends in particular from the bypass branching point 91 to the associated sensor inlet 46.

Figure 5:
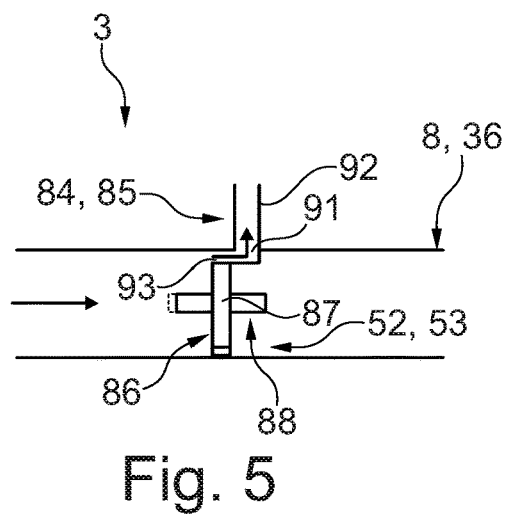
Figure 6:
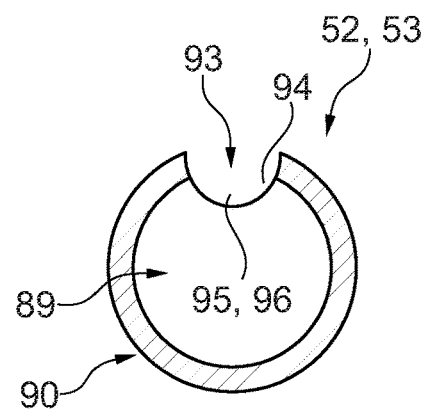

The exemplary embodiment shown in FIG. 5 and FIG. 6 differs from the example shown in FIGS. 3 and 4 in particular by the fact that at the shut-off element 52, 53 the bypass 84, 85 has a flow-permeable cross-section 93 as well as the bypass duct 92, which in the closed position 86 fluidically connects the bypass cross-section 93 to the sensor device 9, in particular extends from the bypass cross-section 93 up to such a sensor inlet 46. As is apparent from FIG. 5, the bypass duct 92 extends via the bypass branching point 91 into the duct 8, 36, in such a way that the bypass duct 92 limits the bypass flow through the bypass cross-section 93 in the closed position 86. The shut-off element 52, 53 is essentially the same as the shut-off element 52, 53 in FIG. 4, with the exception that the flow-permeable bypass cross-section 93 is implemented as a cutout 94 in the seal 90 and a recess 95, in particular a through passage 96 in the base body 89, which adjoins the cutout 94. The bypass cross-section 93 is designed to be complementary to the section of the bypass duct 92 protruding into the duct 8, 6, in such a way that air flowing through the bypass cross-section 93 flows through said section into the bypass duct 92 and reaches the sensor device 9.

Figure 7:
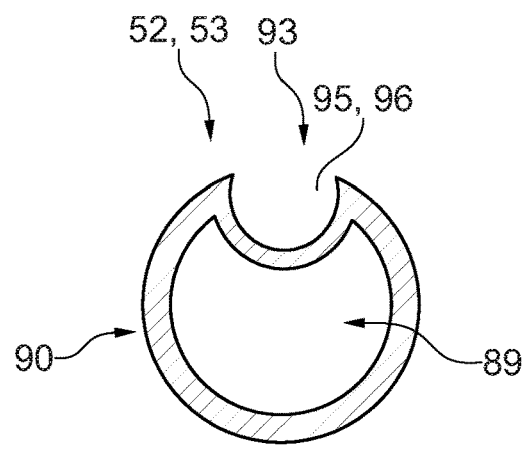

FIG. 7 shows an alternative to the example of the shut-off element 52, 53 shown in FIG. 6, which differs from the example shown in FIG. 5 in that the bypass cross-section 93 has the recess 95 in the base body 89, but no cutout 94 in the seal 90.

Figure 8:
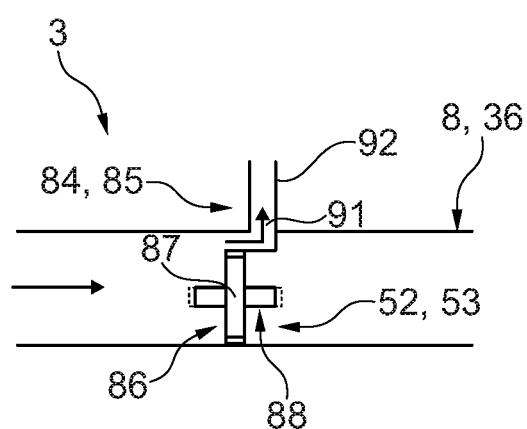
Figure 9:
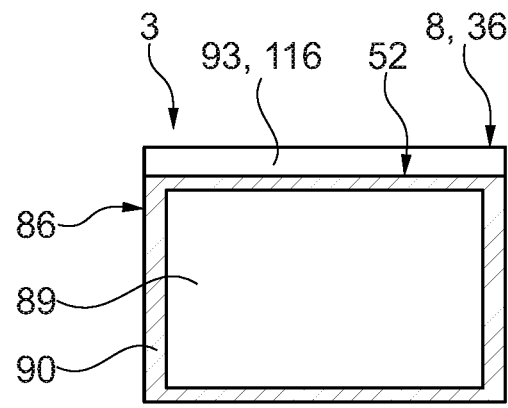

The exemplary embodiment shown in FIGS. 8 and 9 differs from the exemplary embodiment shown in FIGS. 5 and 6 in particular by the fact that the bypass cross-section 93 is formed by a gap 116 provided in the closed position 86 between the shut-off element 52, 53 and the duct 8, 36, in particular a gap of a specified size. In addition, the duct 8, 36, and the shut-off element 52, 53 each have complementary rectangular cross-sections.

Figure 10:
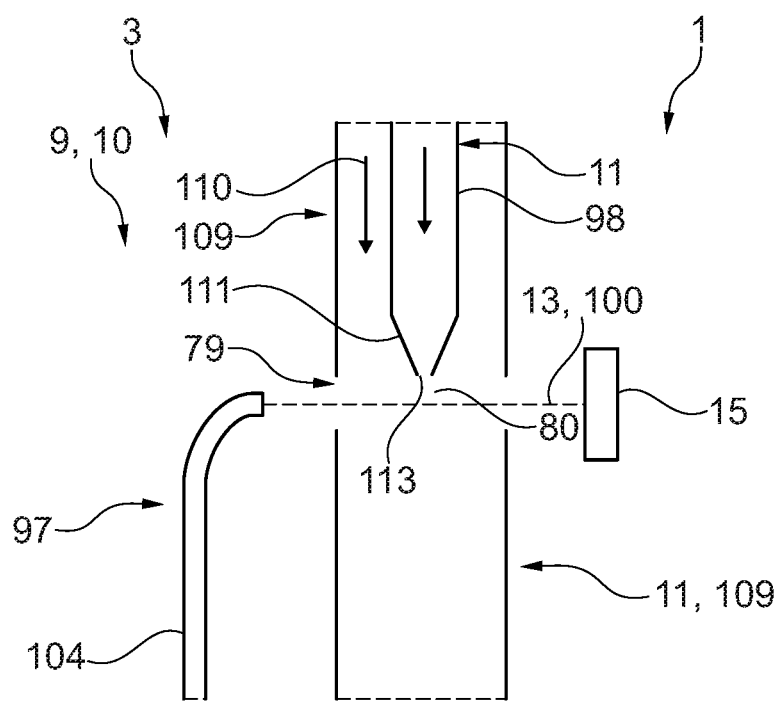

FIG. 10 shows a section through the sensor device 9 or the air-conditioning unit 3 in a further exemplary embodiment, in which a longitudinal section through a such an inspection duct 11 is apparent. In addition, only the deflection device 97, which has a conduit 104 associated with the interaction section 79 of the inspection duct 11 shown, and the associated detector 15 are visible. In this exemplary embodiment the interaction section 79 is formed by a discontinuity 80 in the duct sheath 98 that bounds the flow of air in the inspection duct 11. The inspection duct 11 is surrounded by a sheath air duct 109, which bounds a sheath air flow path 110 of sheath air flowing through the sheath air duct 109. The sheath air is preferably different from the air flowing through the inspection duct 11, in particular air that is purified, for example filtered by means of the unit filter device 6. The sheath air flow path 110 then surrounds the discontinuity 80 of the inspection duct 11 which forms the interaction section 79, in such a way that the sheath air flow path 110 externally bounds the flow of the air flowing through the inspection duct 11 through the interaction section 79. In other words, the sheath air flow path 110 prevents air flowing through the inspection duct 11 in the interaction section 79 from flowing out of the inspection duct 11 and from contaminating the sensor device 9, in particular the generating device 12, the respective detector 5 and/or the deflection device 97. The sheath air duct 109 preferably has a discontinuity 80 which is flush with the discontinuity 80 of the inspection duct 11 and thus with the interaction section 79, wherein the discontinuities 80 of the ducts 11, 109 are arranged in such a way that the associated deflected electromagnetic waves 13 pass through the duct sheath 98 and the sheath air duct 109 without interacting with them. Since the sheath air is purified or filtered air, the interaction of the deflected electromagnetic waves 13 with the sheath air is prevented or at least reduced.

In this exemplary embodiment, the inspection duct 11 and the sheath air duct 109 extend jointly downstream of the interaction section 79 or form a single unit. This means that air flowing through the inspection duct 11 and sheath air are mixed downstream of the interaction section 79 and guided together. In particular, this mixture can be fed back to the duct system 39 via the sensor outlet 47.

In this exemplary embodiment, the inspection duct 11 has a duct nozzle 111 that discharges into the interaction section 79. The duct nozzle 111 thus tapers in the flow direction of the air flowing through the inspection duct 11 towards the interaction section 79. As a result, an outflow of the air flowing through the inspection duct 11 outside of the interaction section 79, in particular into the sensor housing 45, is prevented or at least reduced.

The invention claimed is:

1. An air-conditioning unit of a vehicle for air-conditioning a vehicle interior comprising:
   a unit outlet for discharging air into the vehicle interior;
   an outside-air duct for an intake of outside air, which is fluidically connected to the unit outlet;
   an outside-air shut-off element arranged in the outside-air duct, which in a closed position blocks a flow of outside air through the outside-air duct;
   an air recirculation duct for recirculation of inside air from the vehicle interior, which is fluidically connected to the vehicle interior and the unit outlet;
   a recirculated-air shut-off element arranged in the air recirculation duct, which in a closed position blocks a flow of inside air through the air recirculation duct; and
   a sensor device for detecting a property of air;
   wherein on at least one duct of the outside-air duct and the recirculation duct, a bypass is arranged which bypasses an associated shut-off element and is fluidically connected to the sensor device; wherein the associated shut-off element is one of the outside-air shut-off element and the recirculated-air shut-off element.

2. The air-conditioning unit according to claim 1, wherein:
   the bypass is an outside-air bypass and is arranged on the outside-air duct; and
   a recirculation bypass is arranged on the air recirculation duct, bypasses the recirculated-air shut-off element, and is fluidically connected to the sensor device.

3. The air-conditioning unit according to claim 2, wherein:
   the outside-air bypass branches off of the outside-air duct upstream of the outside-air shut-off element and discharges into the sensor device; and
   the recirculation bypass branches off of the recirculation duct upstream of the recirculated-air shut-off element and discharges into the sensor device.

4. The air-conditioning unit according to claim 3, wherein:
   the air recirculation duct discharges into the outside-air duct at a recirculated-air discharge point disposed downstream from the outside-air shut-off element; and
   the sensor device discharges into the outside-air duct downstream of the recirculated-air discharge point.

5. The air-conditioning unit according to claim 1, wherein, on the associated shut-off element that is bypassed, the bypass has a flow-permeable bypass cross-section and includes a bypass duct, which in the closed position of the associated shut-off element extends from the bypass cross-section to the sensor device.

6. The air-conditioning unit according to claim 5, wherein the bypass cross-section is at least partly formed by a gap defined between the associated shut-off element and the at least one duct when the associated shut-off element is in the closed position.

7. The air-conditioning unit according to claim 5, wherein the bypass cross-section is at least partly formed by a recess on the associated shut-off element.

8. The air-conditioning unit according to claim 7, wherein the associated shut-off element has a base body and a seal fitted on an edge of the base body, which forms a seal against the at least one duct when in the closed position, and wherein the recess is arranged at least partly in the seal.

9. The air-conditioning unit according to claim 7, wherein the associated shut-off element has a base body and a seal fitted on an edge of the base body, which forms a seal against the at least one duct when in the closed position, and wherein the recess is arranged at least partly in the base body.

10. The air-conditioning unit according to claim 9, wherein the recess is a flow permeable through passage.

11. The air-conditioning unit according to claim 8, wherein the recess is a cutout in the seal.

12. The air-conditioning unit according to claim 1, wherein the associated shut-off element has a base body and a seal fitted on an edge of the base body, which forms a seal against the at least one duct when in the closed position.

13. The air-conditioning unit according to claim 1, wherein the bypass branches off the at least one duct upstream of the associated shut-off element which it bypasses, and discharges into the sensor device.

14. The air-conditioning unit according to claim 1, wherein air is flowable to the unit outlet via the bypass.

15. The air-conditioning unit according to claim 1, wherein:
   the bypass includes a bypass duct portion that protrudes into the at least one duct and opens in a direction opposite a through flow direction of the at least one duct;
   a flow-permeable bypass cross-section is at least partly formed by a gap defined between the associated shut-off element and the at least one duct when the associated shut-off element is in the closed position; and
   when the associated shut-off element is in the closed position, air is flowable into the bypass duct portion via the bypass cross-section.

16. The air-conditioning unit according to claim 15, wherein the bypass cross-section is at least partly formed by a recess disposed in a base body of the associated shut-off element.

17. A vehicle comprising a vehicle interior and an air-conditioning unit for air conditioning the vehicle interior, the air-conditioning unit including:
   a unit outlet for discharging air into the vehicle interior;
   an outside-air duct for an intake of outside air, which is fluidically connected to the unit outlet;
   an outside-air shut-off element arranged in the outside-air duct, which in a closed position blocks a flow of outside air through the outside-air duct;
   an air recirculation duct for recirculation of inside air from the vehicle interior, which is fluidically connected to the vehicle interior and the unit outlet;
   a recirculated-air shut-off element arranged in the air recirculation duct, which in a closed position blocks a flow of inside air through the air recirculation duct;
   a sensor device for detecting a property of air, the sensor device fluidically connected to the unit outlet; and
   wherein on at least one duct of the outside-air duct and the recirculation duct, a bypass is arranged which is fluidically connected to the sensor device such that air is flowable from the at least one duct to the unit outlet through the sensor device to bypass an associated shut-off element; wherein the associated shut-off element is one of the outside-air shut-off element and the recirculated-air shut-off element.

18. The vehicle according to claim 17, wherein the bypass has a flow-permeable bypass cross-section and includes a bypass duct extending from the bypass cross-section to the sensor device.

19. The vehicle according to claim 18, wherein:
- a gap is defined between the associated shut-off element and the at least one duct when the associated shut-off element is in the closed position; and
- the gap at least partially defines the bypass cross-section.

20. An air-conditioning unit of a vehicle for air-conditioning a vehicle interior, comprising:
- a unit outlet through which air is flowable into the vehicle interior;
- an outside-air duct fluidically connected to the unit outlet and configured to intake outside air;
- an outside-air shut-off element having a base body and including a seal fitted on an edge of the base body, the outside-air shut-off element arranged in the outside-air duct such that when the outside-air shut-off element is in a closed position the seal sealingly contacts the outside-air duct and a flow of outside air through the outside-air duct is blocked;
- an air recirculation duct configured to recirculate inside air disposed within the vehicle interior, the air recirculation duct fluidically connected to the vehicle interior and the unit outlet;
- a recirculated-air shut-off element having a base body and including a seal fitted on an edge of the base body, the recirculated-air shut-off element arranged in the air recirculation duct such that when the recirculated-air shut-off element is in a closed position the seal sealingly contacts the recirculation duct and a flow of inside air through the air recirculation duct is blocked; and
- a sensor device configured to detect a property of air;
- wherein the outside-air duct includes an outside-air bypass bypassing the outside-air shut-off element, the outside-air bypass branching off of the outside-air duct upstream of the outside-air shut-off element and discharging into the sensor device; and
- wherein the recirculation duct includes a recirculation bypass bypassing the recirculated-air shut-off element, the recirculation bypass branching off of the recirculation duct upstream of the recirculated-air shut-off element and discharging into the sensor device.

* * * * *